May 14, 1963   C. M. SWEET   3,089,524
REDUCTION OF SAW DUST IN CUTTING WOOD BY BENDING THE WOOD
Filed Nov. 21, 1960   6 Sheets-Sheet 1

INVENTOR.
BY Corliss M. Sweet

May 14, 1963 C. M. SWEET 3,089,524
REDUCTION OF SAW DUST IN CUTTING WOOD BY BENDING THE WOOD
Filed Nov. 21, 1960 6 Sheets-Sheet 2

INVENTOR.
Corliss M. Sweet
BY

May 14, 1963  C. M. SWEET  3,089,524
REDUCTION OF SAW DUST IN CUTTING WOOD BY BENDING THE WOOD
Filed Nov. 21, 1960  6 Sheets-Sheet 3

INVENTOR.
Corlise M. Sweet
BY

May 14, 1963  C. M. SWEET  3,089,524
REDUCTION OF SAW DUST IN CUTTING WOOD BY BENDING THE WOOD
Filed Nov. 21, 1960  6 Sheets-Sheet 4

INVENTOR.
BY Corliss M. Sweet

FIG. 13

INVENTOR.
BY Corlise M. Sweet

United States Patent Office 3,089,524
Patented May 14, 1963

3,089,524
REDUCTION OF SAW DUST IN CUTTING WOOD BY BENDING THE WOOD
Corlise M. Sweet, 1000 E. Montana St., Milwaukee, Wis.
Filed Nov. 21, 1960, Ser. No. 70,493
7 Claims. (Cl. 144—312)

This invention shows a new method of cutting wood in which the amount of saw dust cut is reduced.

In application Number 848,452, filed October 23, 1959, Number 17,400, filed March 24, 1960, and now abandoned, and in a companion application, S.N. 70,474, filed November 21, 1960, new saws are shown that will reduce the amount of saw dust cut and improve the surface finish on the wood.

In the conventional method of sawing boards the width of the cutting tip of the saw is made considerably wider than the thickness of the blade. This is done to provide clearance for the blade to pass through the wood that is being cut. If sufficient clearance is not provided some of the saw dust that spills out of the gullets will lodge between the blade and the wood and cause so much friction that it is almost impossible to pull the saw through the groove that is being cut. This requires that the groove or kerf cut in the wood be wide enough to provide space for the blade and the saw dust on the sides of the blade.

It is therefore an object of this invention to show how more lumber can be obtained from a timber by bending the cut board away from the blade and thus reduce the amount of saw dust that it is necessary to cut to provide clearance for the blade.

Another object is to improve the cutting action on some types of wood by simultaneously cutting and placing a tension force across the wood fibers that are to be severed.

A further object is to show how the combination of bending the board and using one of the blades in the companion application that form the wood can be combined into a new method that combines bending, forming and cutting.

Another object is to show how by heating the blade and bending the board away from the blade that some wood can be sliced easier which will further reduce saw dust waste.

A further object is to show how this invention allows the use of thinner blades that can be used on smaller band mills that can be more easily moved from one sawing location to another, and will be more ideal for setting up a program by which a timber can move down a conveyor and have several small bandmills cut off boards before it returns to the sawyer.

Another object is to show that by cutting less saw dust the teeth in the saw can be smaller which will cut a smoother surface on the board.

A further object is to show that by making the tips of the teeth narrower the teeth will not require as much swaging in the sharpening operation, and will allow the teeth to be made harder which will provide longer wear.

In FIGURES 1 to 4 item 1 is the timber to be cut. Item 2 is the stationary guide for the timber. Item 3 is the movable guide for the timber. Item 4 is the dogging tooth that bends the board away from the saw. Item 5 is the saw or blade. Item 6 is the wedge that follows the saw. Item 7 is the board that is being cut. Item 8 is the stationary secondary guide for the timber that is directly behind the wedge 6. Item 9 is the movable secondary guide for the timber. Item 9 in some instances could be combined with the movable guide 3.

Figure 5:
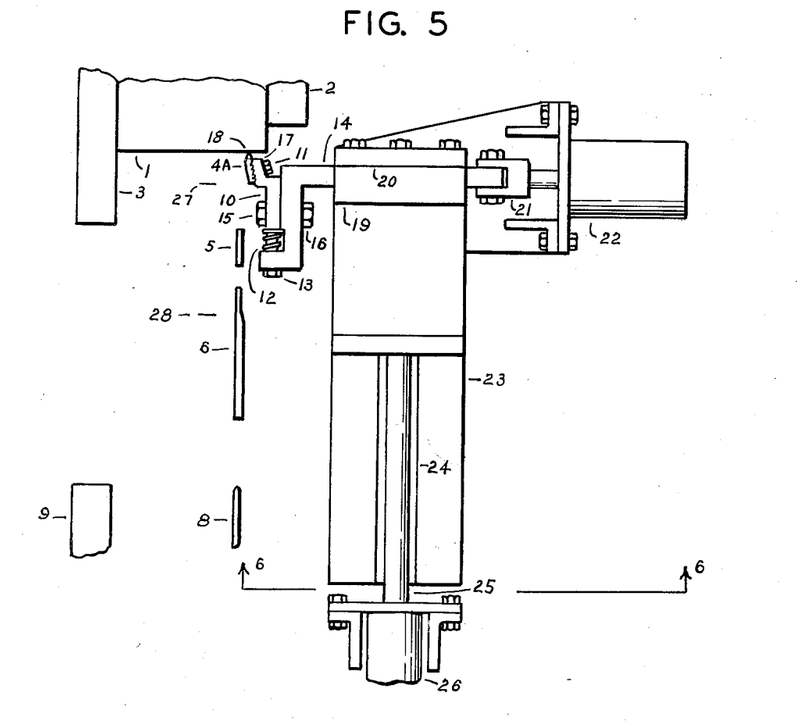
FIGURE 5 is a schematic plan view of a tooth board bending mechanism, controlled by air cylinders, that bends the board away from the blade, and moves the tooth with the timber as the blade cuts a board off the timber.
Figure 6:
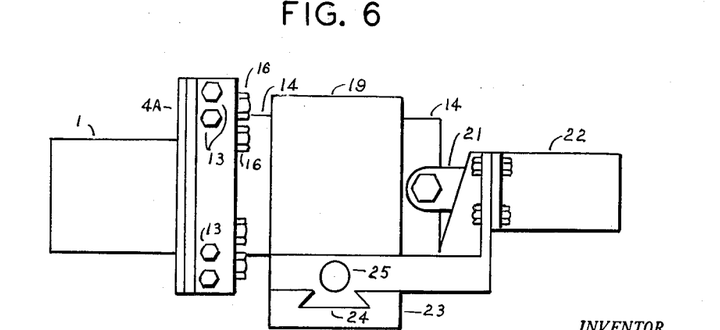
FIGURE 6 is an end elevation of FIGURE 5 looking at it from section 6—6 showing the timber that is to be cut, the tooth that engages the board, and the air cylinder that moves the tooth to bend the board.

In the construction of FIGURES 5 and 6 the dogging tooth 4A is shows with a serrated base that is clamped to a spring loaded part 10 by means of a nut 11. Spring loaded part 10 is spring loaded by springs 12 that are held in place by bolts 13. Spring loaded part 10 is held to the ram 14 by bolts 15 and nuts 16. Spring loaded part 10 has slotted holes for bolts 15 that permits the tooth 4 to automatically adjust for engaging timbers that do not have the ends cut square with the sides. The flat surface 17 on part 10 prevents the point of tooth 18 from digging into the timber too far and splitting it. If there was no flat surface 17 the tooth could dig into the timber too far and split the board. This would be especially true if the same pressure was used on tooth point 18 for a narrow board as was used on a wide board.

Figure 2:
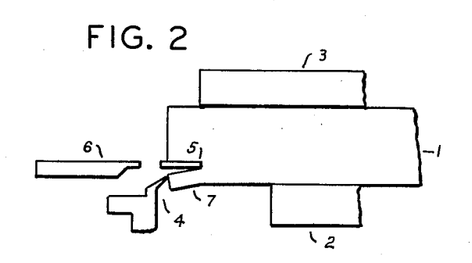
FIGURE 2 is a schematic plan view in which the timber in FIGURE 1 is being cut by the blade and a tooth board bending mechanism is bending the board away from the blade.

The ram 14 is held in a bearing 19 that has a cap 20. Clevis 21 connects the ram 14 to air cylinder 22. Air cylinder 22 exerts the force that bends the board away from the blade as shown in FIGURE 2.

Ram bearing 19 is mounted on a slide 23 and is held in place by a dove tail groove 24. A piston rod 25 connects the ram bearing 19 to an air cylinder 26. Air cylinder 26 places a force on the tooth point 18 that causes it to dig into the timber 1. The air cylinder 26 holds the tooth point 18 in the timber as the timber moves along the conveyor.

Figure 1:
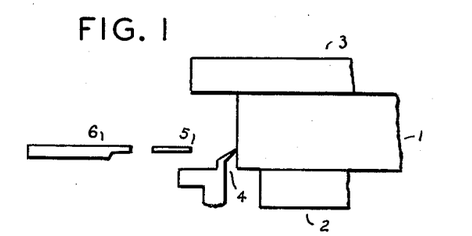
FIGURE 1 is a schematic plan view of a timber that is moving toward the blade, and the mechanisms that bend the board away from the blade.
Figure 3:
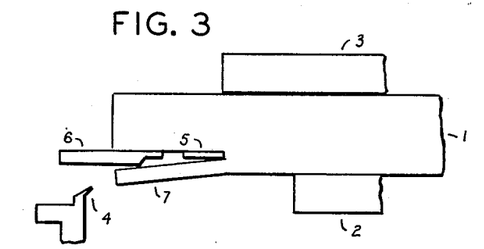
FIGURE 3 is a schematic plan view showing the timber of FIGURE 2 being cut by the blade, a wedge board bending mechanism bending the board away from the blade, and the tooth board bending mechanism disengaged from the board, and moved ahead and to one side of the board.
Figure 4:
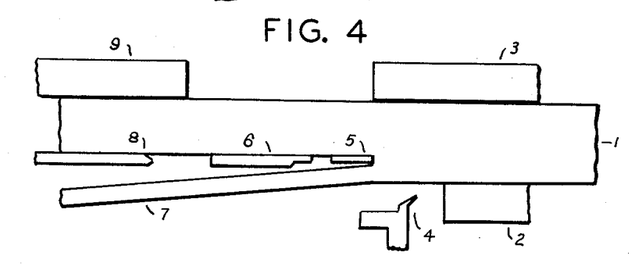
FIGURE 4 is a schematic plan view showing the timber being held in the second set of guides, the wedge board bending mechanism bending the board away from the blade, and the tooth board bending mechanism moved close to the stationary guide and ready to move sideways into the position shown in FIGURE 1.

The operation of the tooth board bending mechanism is as follows. As shown in FIGURES 1 and 5 the tooth 4 engages the timber 1 and is held in contact with the timber by the air pressure in air cylinder 26. When the timber arrives at line 27 in FIGURE 5 an electric switch reverses the air pressure on the piston in air cylinder 22. This causes the piston in the air cylinder 22 to apply a pressure on the tooth 4 to bend the board away from the blade as shown in FIGURE 2. When the timber arrives at line 28 in FIGURE 5 the air pressure is taken off cylinder 22 and immediately the air pressure is reversed in air cylinder 26. This causes the tooth 4 to move ahead of the timber. The air pressure on the air cylinder 22 is again applied which causes the tooth 4 to move to a point out of the line of travel of the timber as shown in FIGURE 3. This sequence of operations is done to apply pressure on the timber when needed, and prevent the tooth 4 from chipping the board. The air pressure is then reversed in air cylinder 26 and the tooth board bending mechanism is moved close to the guide 2 as shown in FIGURE 4. When the timber 1 passes the guide 2 an electric switch reverses the pressure on air cylinder 22 and moves the tooth 4 into the position shown in FIGURES 1 and 5.

Figure 10:
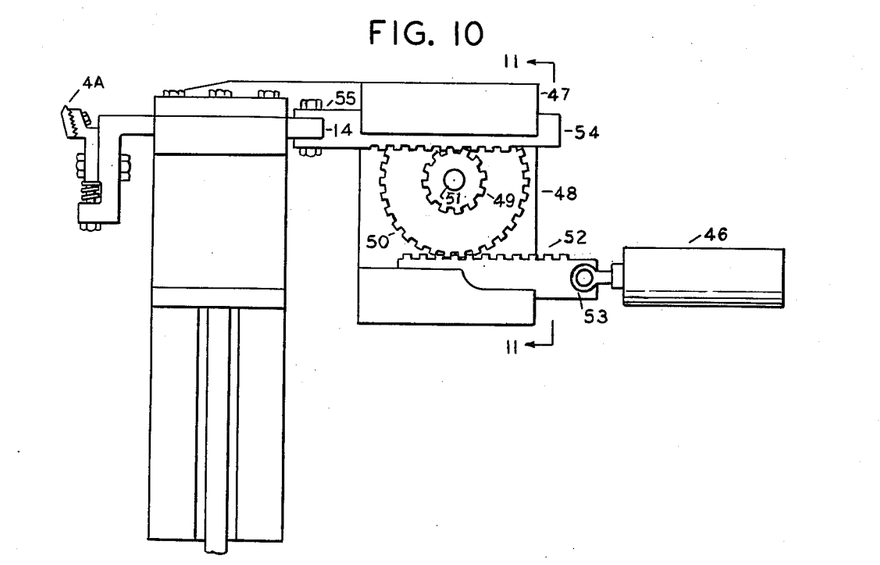
FIGURE 10 is a schematic plan view of a gear reduction unit combined with an air cylinder for bending the board away from the blade.
Figure 11:
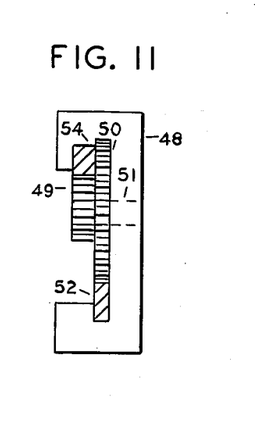
FIGURE 11 is a schematic section view through section 11—11 of FIGURE 10.
Figure 12:
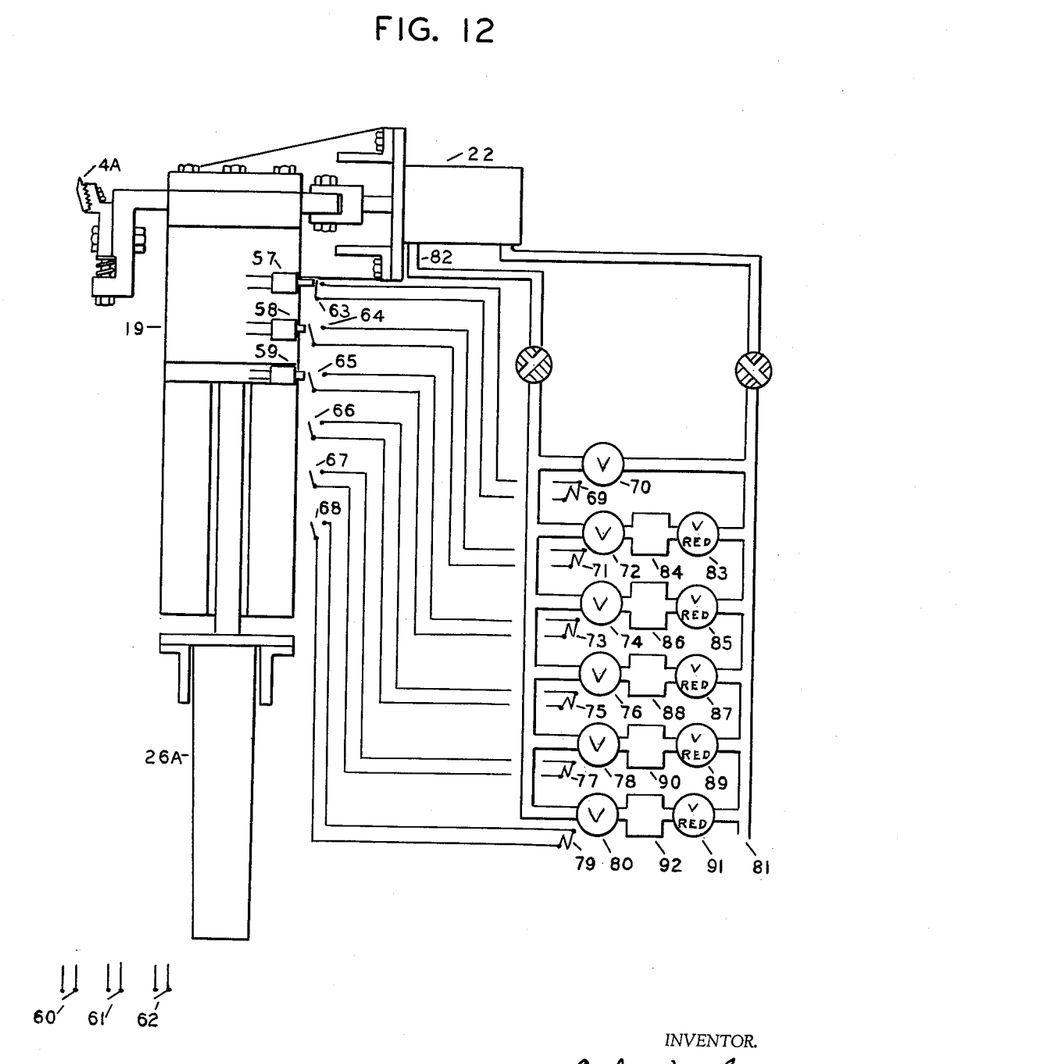
FIGURE 12 is a schematic view showing a method of changing the air pressure in the air cylinder that bends the board away from the blade.

The pressure bending the board away from the blade may have to be changed for different kinds of wood, different thicknesses, and different widths. This can be done by changing the air pressure in the air cylinder 22 as is shown in FIGURE 12. Larger boards will require a greater force to bend them. This can be obtained by the use of a gear reduction unit. It would consist of placing a gear rack on the end of ram 14 in place of clevis 21 and installing a gear reduction unit between the gear rack and the air cylinder 22. This is shown in FIGURES 10 and 11. The movement of the tooth 4 only has to be about one inch. Therefore if air cylinder 22 has a ten inch stroke and a gear reduction unit of one to ten is used, the power exerted by the air cylinder 22 can be increased by approximately nine hundred percent.

In using some types of blades it will be desirable to maintain a steady stretching force on the wood fibers that are to be cut. This force should not be too much as it will split the wood. Also the force should not be too small as then the work will all be done by cutting and very little will be done by the stretching process. A constant force exerted by the tooth 4 on the board 7 increases the tension force on the fibers being cut as the blade 5 moves deeper into the timber 1. The reason this force increases is that the board 7 acts like a lever arm and the longer the lever arm the greater is the force it will exert. This force can be reduced by the use of a valve that changes the air pressure or limits the flow of air into cylinder 22 as tooth 4 pulls the end of board 7 away from the timber 1. This changing of the air pressure in the cylinder reduces the pressure exerted in bending the board and provides a means of placing an approximate uniform tension force on the fibers to be cut.

Figure 7:
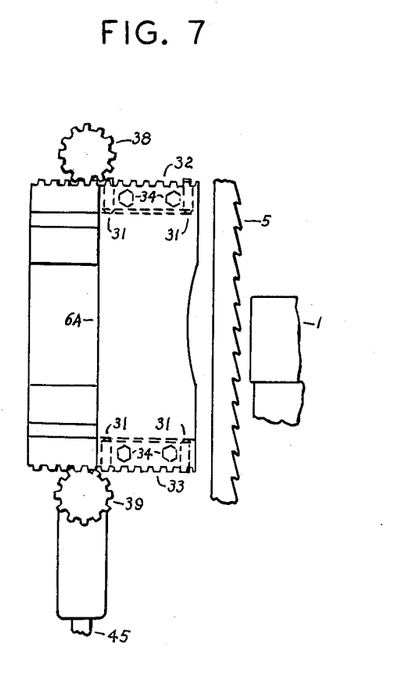
FIGURE 7 is a schematic side elevation of the timber that is to be cut, a section of a band saw blade, the wedge that follows the blade and the gear mechanism that moves the wedge toward and away from the saw.
Figure 8:
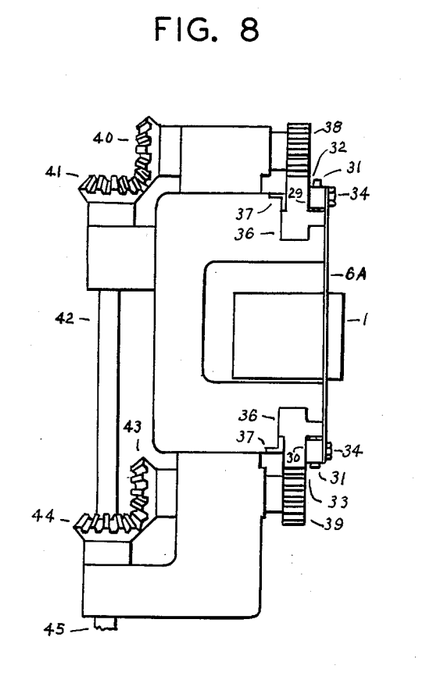
FIGURE 8 is a schematic side elevation of FIGURE 7 looking at it from the left hand side showing the timber that is to be cut, the wedge that bends the board away from the saw, and the gears that move the wedge.
Figure 9:
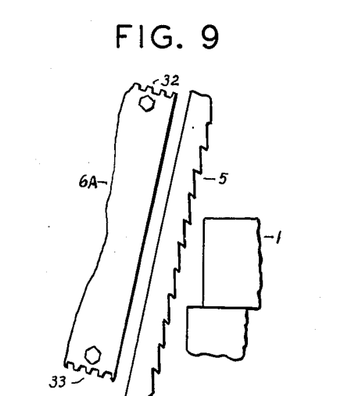
FIGURE 9 is an exaggerated schematic view showing how the saw and wedge of FIGURE 7 can be placed at an angle of less than ninety degrees with the bottom surface of the timber to provide a means for the saw to gradually enter the timber.

The wedge board bending mechanism shown in FIGURES 7 and 8 bends the board away from the blade after the saw has completely entered the timber.

The wedge 6A is brazed or welded to parts 29 and 30. Parts 29 and 30 are stretched in place by screws 31 and held to the sliding racks 32 and 33 by screws 34. The stretching of parts 29 and 30 with screws 34 causes the wedge 6A to be held straight so that it will easily enter the kerf made by the blade. The sliding racks are held in grooves 35 and 36 by angle bars 37.

Rack 32 is moved by pinion 38 and rack 33 is moved by pinion 39. Pinion 38 is connected by a shaft to a miter gear 40. Miter gear 40 is rotated by miter gear 41 that is keyed to shaft 42. Pinion 39 is connected to shaft 42 by miter gears 43 and 44. At the end of shaft 42, shown as 45, is a gear reduction unit not shown. The gear reduction unit will move the wedge closer to the blade or farther from it as desired. It can either be controlled by electric switches or manually. This is explained in FIGURE 13.

The wedge board bending mechanism, shown in FIGURES 7 and 8, provides a method of varying the pressure to bend the board away from the blade by varying the distance the wedge is held from the blade. This will be beneficial in cutting different kinds of wood. In addition to providing more clearance for the blade this could be beneficial in providing a better cutting action. The reason for this is that a fiber that is under tension will break when it is partly cut and it is not necessary to cut all the way through. In conventional sawing the fibers are cut and the chip is broken away. Using the board bending mechanism the fibers are severed by a combined cutting and stretching process.

Another advantage to varying the bending pressure on the board that is being cut is that when the blade comes to the end of the cut a limit switch contacting the timber can start a motor that drives pinions 38 and 39 and causes the wedge to be moved away from the blade. This will reduce the bending pressure on the board and prevent the end of the board from splitting away from the timber this is explained in FIGURE 13.

FIGURES 10 and 11 show an air cylinder 46 that can be combined with a gear reduction unit 47 to replace the air cylinder 22 in FIGURE 5 and thereby provide a greater force on the dogging tooth 4A to bend the board away from the blade. The gear reduction unit has a frame 48 that holds a small gear 49 and a large gear 50 that are fastened to a shaft 51. The large gear 50 is moved by the rack 52 that is held to the air cylinder 46 by the clevis 53. The small gear 49 moves rack 54 which is fastened to the ram 14 by the bolt 55. In this way the air cylinder 46 can exert a greater force on the ram 14 and the dogging tooth 4A. If a greater force is required than can be obtained by the single gear reduction, as shown, a gear reduction unit having two or more reductions can be used. There are many of these on the market.

FIGURE 12 shows the valve arrangement for reducing the air pressure in the cylinder 22 as the blade moves into the timber and the means of changing the air pressure in the cylinder 22 for cutting different width boards. The slide 19 has three solenoids 57, 58 and 59 mounted on it. The machine operator can move any one of the solenoid plungers by the electric switches 60, 61 and 62 which are placed at some distance from the solenoids. In FIGURE 12 the plunger in solenoid 57 is shown moved out. As the board 7 is cut from the timber, as shown in FIGURE 2, the slide 19 in FIGURE 12 moves toward the air cylinder 26A. This causes solenoid 57 to contact electric switches 63, 64, 65 and 66. Switch 63 operates solenoid 69. Solenoid 69 operates the air valve 70. Switch 64 operates solenoid 71 and solenoid 71 operates valve 72. Switch 65 operates solenoid 73 and solenoid 73 operates valve 74. Switch 66 operates solenoid 75 and solenoid 75 operates valve 76. Switch 67 operates solenoid 77 and solenoid 77 operates valve 78. Switch 68 operates solenoid 79 and solenoid 79 operates valve 80.

Each one of the valves 70 to 80 supplies air at a different pressure. Air that has not been reduced in pressure flows from its original source 81 through the valve 70, through the cylinder air intake 82 and into the air cylinder 22. Air at slightly lower pressure flows from the original source 81 through the regulating valve 83, into the air storage receiver 84, through the valve 72 and into the air intake 82. Similarly reducing valve 85 reduces the air pressure to a lower pressure than reducing valve 83. Air flows through reducing valve 85 into the air storage receiver 86, through the valve 74 and through the cylinder intake 82. Regulating valve 87 reduces the air pressure to a lower pressure than regulating valve 85. Air flows from the valve 87 to the air receiver 88 through the valve 76, through air intake 82 and into the cylinder 22. Similarly regulating valve 89 reduces the air pressure to a lower pressure than regulating valve 87. Air flows from the regulating valve 89 to the air receiver 90 through the valve 78 and into the cylinder 22. The regulating valve 91 reduces the air pressure to a lower pressure than valve 89. Air flows from regulating valve 91 into the air receiver 92, through the valve 80 into the air cylinder 22.

The machine would operate as follows. The timber 1 would push the dogging tooth 4A and the slide 19. The solenoid 57 on the slide 19 would operate the electric switches 63 to 66. The switches have timers on them that hold them open for a short period. The switches 63 to 66 would operate the valves 70 to 76. In this way as the blade moves into the timber the air pressure in the cylinder 22 would be reduced and there would be less force on the dogging tooth 4A to pull the board away from the blade.

Narrower width boards that do not require as much pressure to bend them away from the board can use a lower air pressure in the air cylinder 22 by energizing one of the solenoids 58 or 59 instead of solenoid 57. For example if a smaller amount of air pressure is desired to pull the board away from the blade the electric switch 62 would be closed. This would operate the solenoid 59 and cause its plunger to move out. As the slide 19 moves toward cylinder 26A solenoid 59 would operate switches 65 to 68 which in turn would operate valves 74 to 80. Valves 74 to 80 supply air at a lower average pressure than the valves 70 to 76 that are operated by solenoid 57. Therefore the air pressure on the tooth 4A would be less and the force pulling the board away from the blade would be less.

Figure 13:
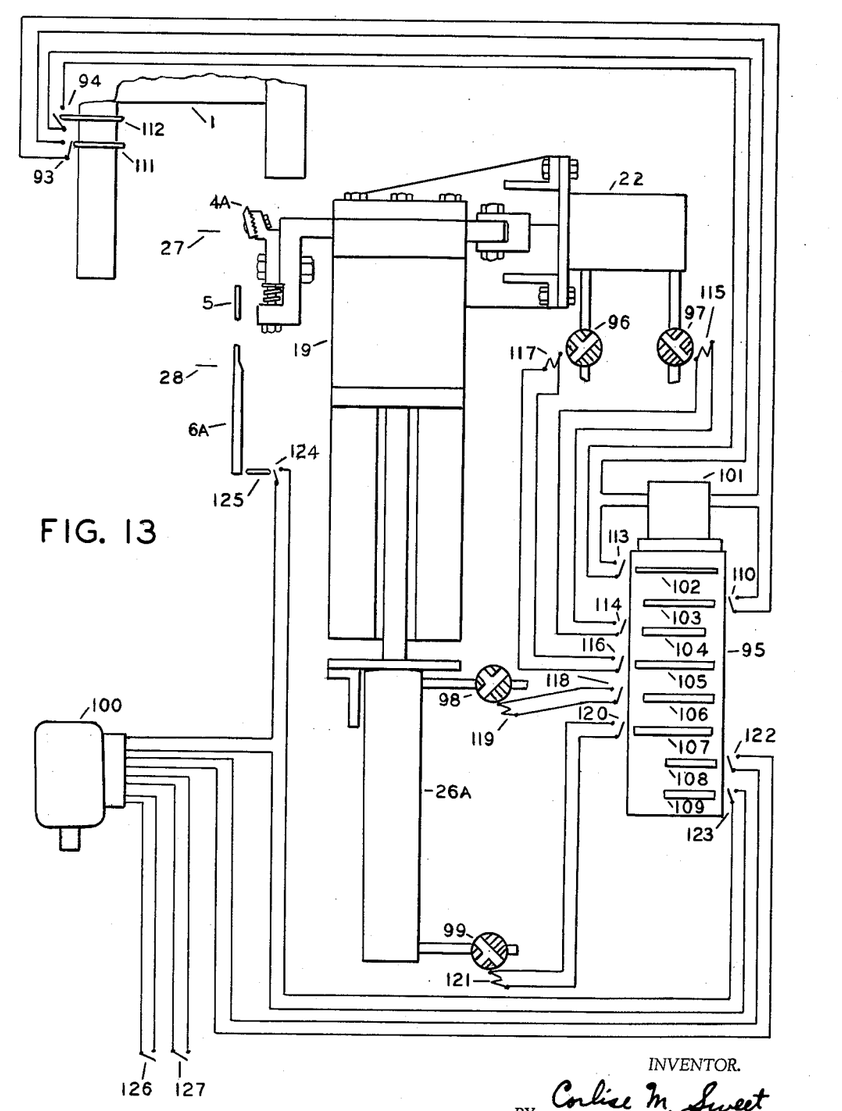
FIGURE 13 is a schematic drawing showing the electric switches for moving the wedge towards and away from the blade, and some of the switches for controlling the air cylinders.

FIGURE 13 shows the controls for moving the wedge 6A and some of the controls for the air cylinders. There are two electric switches 93 and 94 that start the drum controller 95, two three-way valves 96 and 97 that control the air cylinder 22, two three-way valves 98 and 99 that control the air cylinder 26A and a geared motor 100 that moves the wedge 6A by means of the mechanism shown in FIGURES 7 and 8.

The drum controller 95 is driven by a low speed geared motor 101. The drum controller has cams 102, 103, 104, 105, 106, 107, 108 and 109 on its surface. Electric switch 93 is connected with switch 110 to the motor 101. The cam 103 controls the switch 110. When the timber 1 closes the electric switch 93 with the pin 111 the motor 101 starts to rotate the drum controller 95. The drum controller continues to rotate until the cam 103 opens the switch 110 and stops the motor 101. Electric switch 94 is closed by the pin 112 when the end of the timber passes it. Electric switch 94 is connected with electric switch 113 to the motor 101. Electric switch 113 is operated by the cam 102. When the drum controller has rotated the required distance the cam 102 opens the switch 113 and stops the motor 101. Cam 104 operates the switch 114. Switch 114 operates the solenoid 115 which controls the three-way valve 97. Cam 105 operates switch 116 which operates the solenoid 117. Solenoid 117 operates the three-way air valve 96. Cam 106 operates the switch 118. Switch 118 operates the solenoid 119. Solenoid 119 operates the three-way air valve 98. Cam 107 operates switch 120. Switch 120 operates the solenoid 121. Solenoid 121 operates the three-way valve 99. Cam 108 operates switch 122. Switch 122 operates the motor 100 that moves the wedge 6A away from the blade 5 by means of the mechanism shown in FIGURES 7 and 8. Cam 109 operates the switch 123. Switch 123 is connected with switch 124 to the motor 100. Switch 124 is operated by the pin 125 that is in contact with the wedge 6A or the wedge moving mechanism.

The operation of the control is as follows. The switch 110 has been closed by the cam 103. The timber 1 contacts the pin 111 and closes the switch 93. This starts the motor 101 that rotates the drum controller 95. When the timber reaches the line 27 cams 104 and 105 operate the switches 114 and 116 that operate the solenoids 115 and 117 that control the valves 96 and 97. The operation of these valves reverses the air pressure in the cylinder 22 and causes the cylinder 22 to pull the dogging tooth 4A towards the slide 19. When the timber 1 arrives at line 28 the cam 105 operates the valve 96 and causes it to exhaust air from the cylinder 22. This removes all the force that is acting on the dogging tooth 4A that pulls the board away from the blade. Simultaneously the cams 106 and 107 operate the valves 98 and 99 and cause them to reverse the air pressure in the cylinder 26A. Reversing of the air pressure in the cylinder 26A causes the dogging tooth 4A to move ahead of the timber as shown in FIGURE 3. Immediately after that the cam 105 operates the valve 96 and by placing air pressure in the cylinder 22 it moves the dogging tooth 4A out of the path of the timber 1. Immediately after the dogging tooth 4A has moved out of the path of the timber 1 the cams 106 and 107 operate the valves 98 and 99 which reverse the pressure in the cylinder 26A. This causes the dogging tooth 4A to move to the position shown in FIGURE 4. When the above is completed the cam 103 opens the switch 110 and stops the motor 101. In this position the cam 102 has closed the switch 113. When the end of the timber 1 passes the pin 112 the switch 94 is closed. This starts the motor 101. Cam 108 operates switch 122 and starts motor 100 which moves the wedge 6A away from the blade 5. After the wedge 6A has been moved away from the blade 5 the cam 108 operates the switch 122 and stops the motor 100. A short time later when the board is cut from the timber 1, the cam 109 closes the switch 123 and reverses the direction of the motor 100 which causes the wedge 6A to be moved toward the blade 5. When the edge of the wedge 6A passes the pin 125 the pin opens the switch 124 and stops the motor 100. The cams 104 and 105 then operate the valves 96 and 97 which reverses the air pressure in the cylinder 22 and causes the dogging tooth 4A to move into the position shown in FIGURE 1. When the above is completed the cam opens the switch 113 and stops the motor 101. The mechanism is then ready to repeat the cycle for cutting another board from a timber.

Switch 126 and 127 can be used by the machine operator to rotate the motor 100 and thereby experimentally determine the best distance of the wedge 6A from the blade 5. After the best distance is determined the switch 124 and the pin 125 can be adjusted accordingly.

The bending of the board will also reduce the large size of the band mill wheels that are necessary to saw lumber. The large diameter wheels now in use are necessary because the blade must have large gullets to remove the saw dust from the kerf. When a saw has large gullets and large teeth it must necessarily have a thick blade or the tooth will bend in the sawing operation. Using the board bending mechanism shown in this invention will decrease the width of the groove or kerf that is cut in the wood. Decreasing the thickness of the groove will decrease the amount of saw dust cut. Decreasing the amount of saw dust cut will decrease the size of the gullet and lower the height of the tooth. Decreasing the height of the saw tooth will decrease the thickness of the blade. Decreasing the thickness of the blade will allow the use of smaller diameter wheels. Smaller diameter wheels will greatly reduce the size of the band mill and make it more portable. It will also be an advantage to the large saw mills as they can place several band mills in tandem for resawing operations.

In addition to using smaller gullets in the saw the teeth can be closer together. Teeth that are smaller and closer together will allow more teeth to be cutting at one time and usually will cut a smoother surface. The reason the teeth cut a smoother surface is the depth of cut for each tooth can be smaller and small teeth are not so apt to be bent as the larger teeth that cut a thicker chip.

The board bending mechanism will also reduce the time to swage and shape the points of the saw teeth so they are wider than the blade. At present it is necessary to swage the teeth considerable to provide proper clearance between the blade and the wood. Reducing this clearance will reduce the swaging and shaping. A saw tooth that does not have to be swaged can be much harder and it will wear longer before it has to be resharpened.

At the time this in being written it is not known how small the groove or kerf can be in regular sawing operations. It is known that by sharpening a hack saw blade like a knife it is possible using a reciprocating sawing motion to force the blade into a thick board. When this is done it creates so much friction on the sides of the blade that it is very difficult to move the blade. This friction can be almost eliminated by placing a wedge behind the blade and bending the wood away from the blade. This makes cutting much easier and the surface cut by the knife blade is quite smooth. When the blade and wedge are removed from the wood, the wood will spring back. On some specimens the wood will spring back so much that it is not possible to push the blade back in the groove with the hand. This indicates that under certain conditions, using board bending equipment, it will be possible to cut wood with a groove or kerf thinner than the blade.

In order to better explain what this invention will accomplish the following will make a comparison on the size of kerfs now being used to cut lumber and the size of kerfs that can be cut when the board is bent away from the blade. The B. T. and B. Manual is a treatise on the care of saws and knives published by the Covel-Hanchett Company in 1943. This company manufactures saw sharpening equipment. On page 111 they recommend the thickness of the saw tooth to be two times the thickness of the saw plus one gauge or more. Therefore when the saw blade is 15 gauges thick, which is .072 inch thick by the Birmingham Wire Gauge Standard the width of the tooth would be 2×.072+.014=0.158 inch or more. Different saw mills use different thicknesses of saw teeth. One large United States saw mill, that has been in business for many years, follows the practice of making the tips of all saw teeth five gauges wider than the blade when cutting hardwood and six gauges wider than the blade when cutting southern pine logs. This same saw mill uses blades that are 15 gauges thick based on the Birmingham Wire Gauge Standard. A 15 gauge saw is 0.072 inch thick. The tips of the saw for cutting hardwood would be 0.134 inch thick and for southern pine the tip would be 0.148 inch thick. In percentage the saw tips are 86 percent thicker than the blade when cutting hardwood and 105 percent thicker than the blade when cutting southern pine. When the board is bent away from the blade as described above a thinner kerf can be obtained by three different methods. First, an undersized saw can be used. By that it is meant a saw that is thinner and has smaller gullets than is recommended can be used. This undersize saw will allow more of the saw dust to flow into the kerf than is considered good practice but the board being bent away from the blade the saw dust will not wedge the blade in the kerf. Second, the tips of the teeth can be narrower. It is believed that with the bending apparatus the tips of the teeth can be made from fifty percent thicker than the blade to an amount considerably less. Third, by making the tips of the teeth thinner the saw will not cut as much saw dust and the gullets in the blade can be smaller. The gullets being smaller the blade can be thinner. Therefore using either an undersized blade or a blade that has narrower teeth than recommended, or a combination of the two, will reduce the kerf thickness and produce more boards from the timber that is being sawed.

It is also believed that applying heat to a blade will improve the cutting action and make it easier to slice wood. Experiments in cutting wood with a knife show that it is easier to cut wood when the knife is hot than when the knife is cold. It was also found that heating a dull knife to about 600 degrees Fahrenheit improved its cutting action. Researchers have reported that wood loses its strength at about ½ to ⅓ of one percent for each degree of Fahrenheit rise in temperature.

Heat can be applied to a band mill blade directly or by heating the wheels it runs on. Heating can be done by placing heating coils close to both the upper and lower band mill wheels, by applying a flame direct to the wheels and the blade or by insulating the band mill wheels from each other and conducting an electric current from one wheel to the other using the blade as the conductor. A figure illustrating this is shown in application Serial No. 70,474, filed November 21, 1960. This latter would be similar to the resistance welding process. When heat is applied the wheels should be partially enclosed in a metal housing and water should be available to prevent fires.

The blade that is heated will transfer its heat to the surface being cut. The wood surface being cut will cut easier because the fibers being stretched and heat being applied to the wood will weaken the fibers. This combination of heating, stretching, and cutting will allow using a duller blade, and will reduce the time required for sharpening.

The heating of the blade and stretching the wood can also be applied to other wood cutting machines besides band mills. An example of that would be on a power operated reciprocating saw using the methods of heating and stretching mentioned above. Another example is by using some of the new metals than can be stressed up to several hundred thousand pounds per square inch it may be possible to heat a very thin blade by electricity and use that as a stationary cutting blade along with the board bending mechanism to cut small boards. The advantage of using the board bending mechanism along with heating the blade is that the board being bent away from the blade the board cannot conduct the heat away from the sides of the blade as easily, and the edge of the blade will stay hotter to cut the wood.

All the above mechanism is not necessary to obtain benefits from this invention. A stationary wedge behind the blade will assist in reducing the thickness of the kerf. The method to use is to place a stationary wedge behind a band saw blade that is sharpened to cut a minimum of clearance, and by a variable speed conveyor move the timber slowly into the saw until the wedge enters the wood. After the wedge enters the wood the conveyor's speed can be increased to normal. The reason for decreasing the speed until the wedge enters the wood is that when the saw is cutting less than normal the gullets do not fill up with saw duct and there is less tendency for the saw dust to spill out from the gullets and lodge between the blade and the wood to cause friction. It should be noted that in using a stationary wedge that the board can not be bent very much because if it is bent considerable it will split the end of the board away from the timber and the amount saved by cutting a thinner kerf will be lost by having to cut the split section off the end of the board.

Another method by which this invention can be used is to combine it with the blade in the companion application, Serial Number 70,474. In the companion application it was shown how to reduce saw dust waste by forming the wood. Forming the wood as described in the companion application, consists of compressing the sides of the kerf with small raised sections on the sides of the blade thereby reducing the amount of saw dust that is cut by the saw teeth. Using the method of bending the wood described in this application the amount of forming done by the blade in the companion application can be reduced. The combination of bending and a small amount of forming will be a new method of cutting. Heating the blade can also be added to the combination. The new method of severing would then consist of heating, bending, forming, and cutting.

A summary of the advantages provided by this invention are: more lumber can be obtained from the timber, smaller size band mills can be used, saw teeth can be harder, the method of cutting wood under tension will be beneficial on some operations, the combination of heating the blade and stretching the board away from the blade will make it easier to slice wood, and wood that is sliced or cut by saws having smaller teeth will have a better surface appearance than wood that is cut by saws having large teeth.

I claim:

1. A bandmill having a dogging type tooth controlled by air cylinders that bends the board being cut off away from the blade, comprising a dogging type tooth board bending mechanism, said mechanism having at least one dogging type tooth that engages the end of the board that is to be cut from the timber, said tooth to be mounted on a slide that is located to the side of the timber from which the board is to be sawn, said slide to be set at an angle of approximately 90 degrees to the side of the blade, said slide to be connected to an air cylinder that pulls the tooth and the board being cut away from the blade, said slide to be mounted on a second slide that is approximately parallel to the side of the blade and to the path of the timber, said second slide being mounted on a non-moving structure and connected to an air cylinder that pushes the slide and forces said tooth into the end of said board that is to be cut from the timber, and said mechanism having means of reversing the air pressure in the air cylinder of said second slide thereby disengaging said tooth from said board and means for reversing the air pressure in the first cylinder thereby moving the first slide and the tooth out of the path of the board at the proper time.

2. Claim 1 in which said first mentioned air cylinder has a means of regulating the air to reduce the pulling pressure on the tooth as the blade moves into the timber.

3. The method of placing an approximate uniform stretching force on the fibers of a board to be cut from a timber, comprising pushing at least one dogging type tooth against the end of the board that is to be cut from a timber, exerting a pulling force on said tooth in a direction away from the blade and at an angle of approximately 90 degrees to the side of the blade thereby bending the board being cut off and placing a stretching force on the wood fibers on the convex side of the board to be cut off, cutting a kerf in those of said wood fibers that are being most stretched with a blade, reducing the pressure exerted on said tooth as the blade moves into the timber, thereby providing an approximate uniform stretching force on the wood fibers being cut, and transferring the means of stretching the wood fibers being cut from said tooth to a wedge that follows said blade in the kerf.

4. The method of placing a stretching force on the fibers of a board to be cut from a timber, comprising pushing at least one dogging type tooth against the end of a board that is to be cut from a timber, exerting a pulling force with a power operated device on said tooth in a direction away from the blade and at an angle of approximately 90 degrees to the side of the blade thereby bending the board being cut off and placing a stretching force on the wood fibers on the convex side of the board to be cut off, cutting a kerf in those of said fibers that are being most stretched with a blade and transferring the means of stretching the wood fibers being cut from said tooth to a wedge that follows said blade in the kerf.

5. The method described in claim 4 in which the distance from the wedge to the blade is increased when the trailing end of the timber approaches the blade thereby reducing the force that bends the board away from the blade and simultaneously reducing the tendency of the board to split away from the timber.

6. The method of cutting boards from timbers that places a tension force on the wood fibers being cut from one end of the cut to the other, comprising simultaneously cutting a board from a timber with a blade and bending said board being sawn from the timber away from the side of said blade with a band mill, said band mill having a dogging tooth bending mechanism and a wedge bending mechanism, said dogging tooth bending mechanism having two air cylinders, the first of said air cylinders having means of holding a dogging tooth in the end of said board being sawn from the timber, the second of said air cylinders having means of pulling said dogging tooth in a direction away from the side of said blade thereby bending the board whereby the side of said board nearest the blade is convex, said wedge bending mechanism having means of holding a wedge in the kerf cut by said blade, and after said wedge enters the kerf said air cylinder having means of disengaging said dogging tooth from said board being sawn and moving said dogging tooth out of the path of the timber.

7. A band mill that has an adjustable wedge that can bend a board being sawn from a timber to different distances from the side of the blade, comprising a board bending mechanism, said board bending mechanism having a wedge that is held in the kerf behind the blade for the purpose of bending the board being cut away from the side of the blade, the upper side of said wedge being fastened to a gear rack, the lower side of said wedge being fastened to a second rack, both of said racks having bearing surfaces attached that slide in grooves in the board bending structure, thereby said bearing surfaces and grooves allow the wedge to be moved in the kerf toward the blade or away from the blade whereby said board can be bent different distances from the side of the blade, each of said racks to be driven by a gear, said gears to be connected by shafts and gears to a single shaft thereby by rotating said single shaft the gears that drive said racks are rotated and said racks and wedge are moved to different distances from the blade whereby said board board being sawn from the timber can be bent the correct amount to provide the optimum cutting condition for the specie of wood and the thickness of board being cut.

References Cited in the file of this patent

UNITED STATES PATENTS

| 259,661 | Bowker | June 20, 1882 |
| 771,518 | Wilson | Oct. 4, 1904 |
| 1,481,459 | Dickie | Jan. 22, 1924 |
| 2,972,669 | Brown | Feb. 21, 1961 |

FOREIGN PATENTS

| 19,695 | Germany | October 1882 |
| 917,502 | Germany | Sept. 6, 1954 |